US012424130B2

(12) United States Patent
Meng et al.

(10) Patent No.: US 12,424,130 B2
(45) Date of Patent: Sep. 23, 2025

(54) COMPENSATING METHOD AND APPARATUS FOR DISPLAY PANEL, AND DISPLAY DEVICE

(71) Applicants: Hefei BOE Joint Technology Co., Ltd., Anhui (CN); BOE Technology Group Co., Ltd., Beijing (CN)

(72) Inventors: Song Meng, Beijing (CN); Wenchao Bao, Beijing (CN); Cheng Xu, Beijing (CN); Miao Liu, Beijing (CN)

(73) Assignees: HEFEI BOE JOINT TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/289,120

(22) PCT Filed: Jan. 6, 2023

(86) PCT No.: PCT/CN2023/070830

§ 371 (c)(1),
(2) Date: Nov. 1, 2023

(87) PCT Pub. No.: WO2024/145889

PCT Pub. Date: Jul. 11, 2024

(65) Prior Publication Data

US 2025/0095523 A1 Mar. 20, 2025

(51) Int. Cl.

| | |
|---|---|
| ***G09G 3/20*** | (2006.01) |
| ***G09G 3/00*** | (2006.01) |
| ***G09G 3/3233*** | (2016.01) |

(52) U.S. Cl.
CPC .......... *G09G 3/006* (2013.01); *G09G 3/2092* (2013.01); *G09G 3/3233* (2013.01);
(Continued)

(58) Field of Classification Search
CPC .... G09G 3/006; G09G 3/2092; G09G 3/3233; G09G 2300/0842; G09G 2310/08; G09G 2330/10; G09G 2330/12
See application file for complete search history.

(56) References Cited

U.S. PATENT DOCUMENTS

2018/0075798 A1* 3/2018 Nho .......................... G09G 3/32
2019/0130837 A1 5/2019 Chen
(Continued)

FOREIGN PATENT DOCUMENTS

CN 101119502 A 2/2008
CN 103475828 A 12/2013
(Continued)

*Primary Examiner* — Robert J Michaud
(74) *Attorney, Agent, or Firm* — XSENSUS LLP

(57) ABSTRACT

A compensating method for a display panel including: acquiring sensing voltages of a target sub-pixel and a sub-pixel set, where the sub-pixel set comprises a plurality of first sub-pixels, and the first sub-pixels are disposed within a set range around the target sub-pixel and have a same color as the target sub-pixel; determining, based on the sensing voltages of the target sub-pixel and the sub-pixel set, whether the target sub-pixel belongs to a defective pixel; replacing the sensing voltage of the target sub-pixel by a sensing voltage of a normal pixel in the sub-pixel set, if the target sub-pixel belongs to the defective pixel; and electrically compensating the target sub-pixel based on a replaced sensing voltage.

18 Claims, 7 Drawing Sheets

(52) U.S. Cl.
CPC . *G09G 2300/0842* (2013.01); *G09G 2310/08* (2013.01); *G09G 2330/10* (2013.01); *G09G 2330/12* (2013.01)

(56) References Cited

U.S. PATENT DOCUMENTS

| | | | | |
|---|---|---|---|---|
| 2020/0143723 | A1 | 5/2020 | Kim et al. | |
| 2020/0152101 | A1 | 5/2020 | Li et al. | |
| 2022/0139325 | A1 | 5/2022 | Lee et al. | |
| 2023/0215383 | A1 * | 7/2023 | Lim ..................... | G09G 3/3233 |

FOREIGN PATENT DOCUMENTS

| | | | |
|---|---|---|---|
| CN | 106683605 | A | 5/2017 |
| CN | 107633810 | A | 1/2018 |
| CN | 110891172 | A | 3/2020 |
| CN | 111145673 | A | 5/2020 |
| CN | 112020729 | A | 12/2020 |
| CN | 114038366 | A | 2/2022 |
| CN | 114446246 | A | 5/2022 |
| CN | 114666575 | A | 6/2022 |
| CN | 114743499 | A | 7/2022 |
| CN | 115000147 | A | 9/2022 |
| KR | 2015-0077597 | A | 7/2015 |

* cited by examiner

COMPENSATING METHOD AND APPARATUS FOR DISPLAY PANEL, AND DISPLAY DEVICE

CROSS-REFERENCE TO RELATED APPLICATION

This application is a US national stage of international application No. PCT/CN2023/070830, filed on Jan. 6, 2023, the disclosure of which is incorporated herein by reference in its entirety.

TECHNICAL FIELD

The present disclosure relates to the field of display technologies, and particularly relates to a compensating method and apparatus for a display panel, and a display device.

BACKGROUND OF THE INVENTION

A large-size organic light-emitting diode (OLED) display panel is prone to uneven panel luminance, which requires an electrical compensation solution for improvement. The electrical compensation solution is to allow current for driving a thin-film transistor (TFT) on the OLED panel to flow to a sensing line (sense), and enable charge to accumulate on the sensing line to form a sensing voltage. A threshold voltage or mobility ratio for driving the TFT is calculated based on the sensing voltage, such that pixels where the TFT is driven are compensated.

In a process for manufacturing the OLED display panel, the occurrence of defective pixels is inevitable. However, the defective pixels can adversely affect the above electrical compensation solution, resulting in incorrect compensation.

SUMMARY OF THE INVENTION

Embodiments of the present disclosure provide a compensating method and apparatus for a display panel, and a display device, so as to solve a problem of incorrect compensation caused by defective pixels. The technical solution is as follows.

In a first aspect, a compensating method for a display panel is provided, and includes:

- acquiring sensing voltages of a target sub-pixel and a sub-pixel set, where the sub-pixel set includes a plurality of first sub-pixels, and the first sub-pixels are disposed within a set range around the target sub-pixel and have the same color as the target sub-pixel;
- determining, based on the sensing voltages of the target sub-pixel and the sub-pixel set, whether the target sub-pixel belongs to a defective pixel;
- replacing the sensing voltage of the target sub-pixel by a sensing voltage of a normal pixel in the sub-pixel set, if the target sub-pixel belongs to the defective pixel; and
- electrically compensating the target sub-pixel based on a replaced sensing voltage.

Optionally, determining, based on sensing voltages of the target sub-pixel and the sub-pixel set, whether the target sub-pixel belongs to the defective pixel includes:

- determining, based on the sensing voltages of the target sub-pixel and two adjacent first sub-pixels, whether the target sub-pixel is the normal pixel, where the two adjacent first sub-pixels are two first sub-pixels, adjacent to the target sub-pixel, in the sub-pixel set; and

- determining whether the target sub-pixel is the defective pixel by comparing the sensing voltage of the target sub-pixel with sensing voltages of the plurality of first sub-pixels if the target sub-pixel is not the normal pixel, where the plurality of first sub-pixels are at least partially different from the two adjacent first sub-pixels.

Optionally, determining whether the target sub-pixel is the normal pixel by comparing the sensing voltage of the target sub-pixel with the sensing voltages of the two adjacent first sub-pixels includes:

- determining that the target sub-pixel is the normal pixel, if the difference value between the sensing voltage of the target sub-pixel and the sensing voltage of each of the two adjacent first sub-pixels is within a threshold range;

or,

- determining that the target sub-pixel is the normal pixel, if the difference value between the sensing voltage of the target sub-pixel and a sensing voltage of a normal pixel in the two adjacent first sub-pixels is within a threshold range.

Optionally, determining whether the target sub-pixel is the normal pixel by comparing the sensing voltage of the target sub-pixel with the sensing voltages of the two adjacent first sub-pixels further includes:

- determining that the target sub-pixel is not the normal pixel, if the difference value between the sensing voltage of the target sub-pixel and the sensing voltage of each of the two adjacent first sub-pixels is not within the threshold range; or,
- determining that the target sub-pixel is not the normal pixel, if the difference value between the sensing voltage of the target sub-pixel and a sensing voltage of one of the two adjacent first sub-pixels is within the threshold range and one of the two adjacent first sub-pixels is not the normal pixel.

Optionally, the threshold range is:

[−P, P], P is a positive integer, a value range of P is 4 to 80, and the unit of P is acquisition accuracy of a sensing voltage acquired by an ADC in a source controller.

Optionally, the value of P when determining whether the difference value between the sensing voltage of the target sub-pixel and a sensing voltage of a second sub-pixel is within the threshold range is greater than the value of P when determining whether the difference value between the sensing voltage of the target sub-pixel and a sensing voltage of a third sub-pixel is within the threshold range, where the second sub-pixel and the third sub-pixel are two of the plurality of first sub-pixels, and the distance between the third sub-pixel and the target sub-pixel is shorter than the distance between the second sub-pixel and the target sub-pixel.

Optionally, determining whether the target sub-pixel is the detective pixel by comparing the sensing voltage of the target sub-pixel with the sensing voltages of the plurality of first sub-pixels further includes:

- determining that the target sub-pixel is the defective pixel, if the difference value between the sensing voltage of the target sub-pixel and a sensing voltage of any one of B first sub-pixels in A first sub-pixels is greater than the upper limit of the threshold range or less than the lower limit of the threshold range; or,
- determining that the target sub-pixel is the defective pixel, if the difference value between the sensing voltage of the target sub-pixel and a sensing voltage of any one of D first sub-pixels in C first sub-pixels is greater than an upper limit of the threshold range or less than a lower limit of the threshold range, where A, B, C and D are all positive integers, A is greater than or equal to B, B is greater than or equal to 2, C is greater than or equal to D, and D is greater than B.

Optionally, determining whether the target sub-pixel is the detective pixel by comparing the sensing voltage of the target sub-pixel with the sensing voltages of the plurality of first sub-pixels further includes:

determining whether the difference value between the sensing voltage of the target sub-pixel and the sensing voltage of any one of D first sub-pixels in C first sub-pixels is greater than the upper limit of the threshold range or less than the lower limit of the threshold range, if difference values between the sensing voltage of the target sub-pixel and sensing voltages of any B first sub-pixels in A first sub-pixels are not all greater than the upper limit of the threshold range or not all less than the lower limit of the threshold range; and determining that the target sub-pixel is the normal pixel, if difference values between the sensing voltage of the target sub-pixel and sensing voltages of any D first sub-pixels in C first sub-pixels are not all less than the lower limit of the threshold range or not all greater than the upper limit of the threshold range.

Optionally, coordinates of the target sub-pixel are (M, N) which represent the $M^{th}$ row and $N^{th}$ column, and both M and N are positive integers; and the sub-pixel set includes at least part of first sub-pixels within the following coordinate range:

the abscissa range is M−6 to M+6, and the ordinate range is N−6 to N+6.

In a second aspect, a compensating apparatus for a display panel is provided, and includes:

a source controller, where the source controller is electrically connected to sub-pixels of the display panel through a sensing line, and is configured to acquire sensing voltages of a target sub-pixel and a sub-pixel set, the sub-pixel set includes a plurality of first sub-pixels, and the first sub-pixels are disposed within a set range around the target sub-pixel and have the same color as the target sub-pixel; and a timing controller, where the timing controller is electrically connected to the source controller, and is configured to: determine, based on the sensing voltages of the target sub-pixel and the sub-pixel set, whether the target sub-pixel belongs to a defective pixel, replace the sensing voltage of the target sub-pixel by a sensing voltage of a normal pixel in the sub-pixel set, if the target sub-pixel belongs to the defective pixel, and transmit a replaced sensing voltage of the target sub-pixel to the source controller, and where the source controller is further electrically connected to a data line of the display panel, and is configured to electrically compensate the target sub-pixel based on the replaced sensing voltage.

Optionally, the timing controller is configured to:

determine, based on sensing voltages of the target sub-pixel and two adjacent first sub-pixels, whether the target sub-pixel is the normal pixel, where the two adjacent first sub-pixels are two first sub-pixels, adjacent to the target sub-pixel, in the sub-pixel set; and determine whether the target sub-pixel is the defective pixel by comparing the sensing voltage of the target sub-pixel with sensing voltages of the plurality of first sub-pixels if the target sub-pixel is not the normal pixel, where the plurality of first sub-pixels are at least partially different from the two adjacent first sub-pixels.

Optionally, the timing controller is configured to:

determine that the target sub-pixel is the normal pixel, if the difference value between the sensing voltage of the target sub-pixel and the sensing voltage of each of the two adjacent first sub-pixels is within a threshold range; or, determine that the target sub-pixel is the normal pixel, if the difference value between the sensing voltage of the target sub-pixel and the sensing voltage of a normal pixel in the two adjacent first sub-pixels is within a threshold range.

Optionally, the timing controller is further configured to:

determine that the target sub-pixel is not the normal pixel, if the difference value between the sensing voltage of the target sub-pixel and the sensing voltage of each of the two adjacent first sub-pixels is not within the threshold range; or, determine that the target sub-pixel is not the normal pixel, if the difference value between the sensing voltage of the target sub-pixel and a sensing voltage of one of the two adjacent first sub-pixels is within the threshold range and one of the two adjacent first sub-pixels is not the normal pixel.

Optionally, the threshold range is:

[−P, P], P is a positive integer, a value range of P is 4 to 80, and the unit of P is acquisition accuracy of a sensing voltage acquired by an ADC in a source controller.

Optionally, the value of P when determining whether the difference value between the sensing voltage of the target sub-pixel and a sensing voltage of a second sub-pixel is within the threshold range is greater than the value of P when determining whether the difference value between the sensing voltage of the target sub-pixel and a sensing voltage of a third sub-pixel is within the threshold range, and where the second sub-pixel and the third sub-pixel are two of the plurality of first sub-pixels, and the distance between the third sub-pixel and the target sub-pixel is shorter than the distance between the second sub-pixel and the target sub-pixel.

Optionally, the timing controller is configured to:

determine that the target sub-pixel is the defective pixel, if the difference value between the sensing voltage of the target sub-pixel and a sensing voltage of any one of B first sub-pixels in A first sub-pixels is greater than the upper limit of the threshold range or less than the lower limit of the threshold range; or, determine that the target sub-pixel is the defective pixel if the difference value between the sensing voltage of the target sub-pixel and a sensing voltage of any one of D first sub-pixels in C first sub-pixels is greater than an upper limit of the threshold range or less than a lower limit of the threshold range, where A, B, C and D are all positive integers, A is greater than or equal to B, B is greater than or equal to 2, C is greater than or equal to D, and D is greater than B.

Optionally, the timing controller is further configured to:

determine whether the difference value between the sensing voltage of the target sub-pixel and the sensing voltage of any one of D first sub-pixels in C first sub-pixels is greater than the upper limit of the threshold range or less than the lower limit of the threshold range if the difference values between the sensing voltage of the target sub-pixel and sensing voltages of any B first sub-pixels in A first sub-pixels are not all greater than the upper limit of the threshold range or not all less than the lower limit of the threshold range; and determine that the target sub-pixel is the normal pixel, if the difference values between the sensing voltage of the target sub-pixel and sensing voltages of any D first sub-pixels in C first sub-pixels are not all less than the lower limit of the threshold range or not all greater than the upper limit of the threshold range.

Optionally, coordinates of the target sub-pixel are (M, N) which represent the $M^{th}$ row and $N^{th}$ column, and both M and N are positive integers; and the sub-pixel set includes at least part of first sub-pixels within the following coordinate range:

the abscissa range is M−6 to M+6, and the ordinate range is N−6 to N+6.

In a third aspect, a display device is provided, and includes a processor and a memory, where the memory is configured to store a computer program; and the processor is configured to execute the computer program stored in the memory to implement any one of the methods for compensating the display panel according to the first aspect.

In a fourth aspect, a computer-readable storage medium storing a computer instruction therein is provided, where the computer instruction, when executed by a processor, enables the processor to implement any one of the methods for compensating the display panel according to the first aspect.

The technical solutions according to the embodiments of the present disclosure have the following beneficial effects.

In the embodiments of the present disclosure, the sensing voltages of the target sub-pixel and the sub-pixel set are acquired, and then whether the target sub-pixel is the defective pixel is determined based on the acquired sensing voltages. In the case that the target sub-pixel is the defective pixel, the target sub-pixel is replaced by any one of the other sub-pixels within the set range around the target sub-pixel, and then electrical compensation is performed, thereby avoiding a problem of incorrect compensation for the defective pixel.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, the embodiments of the present disclosure are described in detail hereinafter with reference to the accompanying drawings.

In order to understand the solutions provided by the present disclosure, first, an electrical compensation solution of a display panel is explained.

Figure 1:
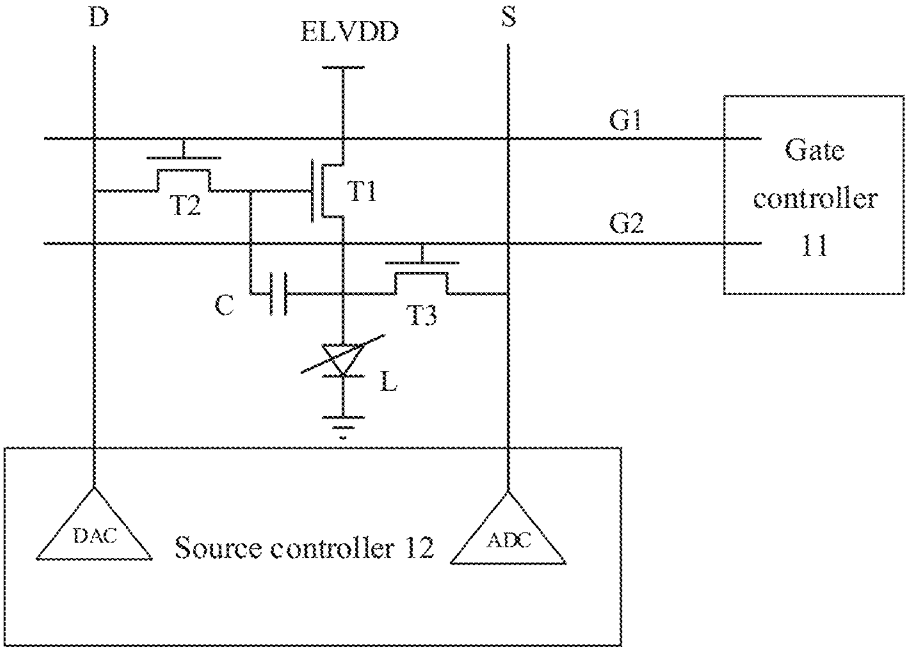
FIG. 1 is a pixel circuit diagram according to an embodiment of the present disclosure.

FIG. 1 is a pixel circuit diagram according to an embodiment of the present disclosure. Referring to FIG. 1, the electrical compensation pixel circuit is a 3T1C, where a T1, a T2 and a C are included in an original 2T1C pixel circuit, and have a function of controlling a light emitting device L to emit light. The T1 is a driven thin film transistor (TFT). For example, a gate controller 11 controls the T2 to be turned on through a gate line G1; and at this time, a source controller 12 writes a data voltage to a gate of T1 through a data line (D) to drive the T1 to be turned on. Upon the T1 being turned on, current flows to the light emitting device L through the T1, and the light emitting device L emits light.

The gate controller 11 may be a gate on array (GOA)/gate integrated circuit (IC); and the source controller 12 may be a source IC.

A T3, a sensing line S and a gate line G2 shown in FIG. 1 have a function of detecting a sensing voltage. For example, the gate controller 11 controls the T3 to be turned on through the gate line G2; and at this time, the current for driving the TFT flows to the sensing line, charge accumulates on the sensing line to form a sensing voltage, and the magnitude of the sensing voltage is detected by the source controller.

Figure 2:
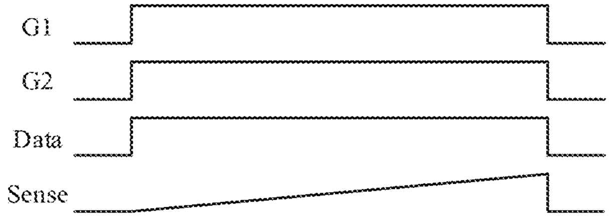
FIG. 2 is a schematic timing diagram of an electrical compensation pixel circuit shown in FIG. 1.

FIG. 2 is a schematic timing diagram of the electrical compensation pixel circuit shown in FIG. 1. Referring to FIG. 2, in a detection process, the G1 and the G2 are at high levels. The data line provides a data voltage (Data) which is output by a digital-to-analog converter (DAC) in the source controller controlled by a timing controller (TCON). Upon the T1 being turned on, current flows to the sensing line, and the magnitude of the current is directly related to a threshold voltage of the T1 and a mobility ratio. Charge accumulates on the sensing line, and the sensing voltage (Sense) gradually increases.

Figure 3:
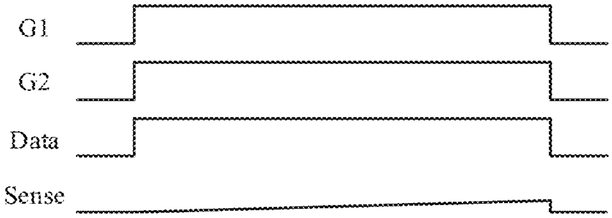
FIG. 3 is a schematic timing diagram of the electrical compensation pixel circuit shown in FIG. 1.

If the light emitting device L is short-circuited or slightly short-circuited, as shown in FIG. 1, the sensing voltage is pulled down by a ground (GND) in the pixel circuit. In this case, the waveform of the sensing voltage is shown in FIG. 3, and a lower sensing voltage is detected. Similarly, if the anode of the light emitting device L is short-circuited with a device with a higher voltage, the sensing voltage is pulled up. The sensing voltages detected in both cases are inaccurate.

Figure 4:
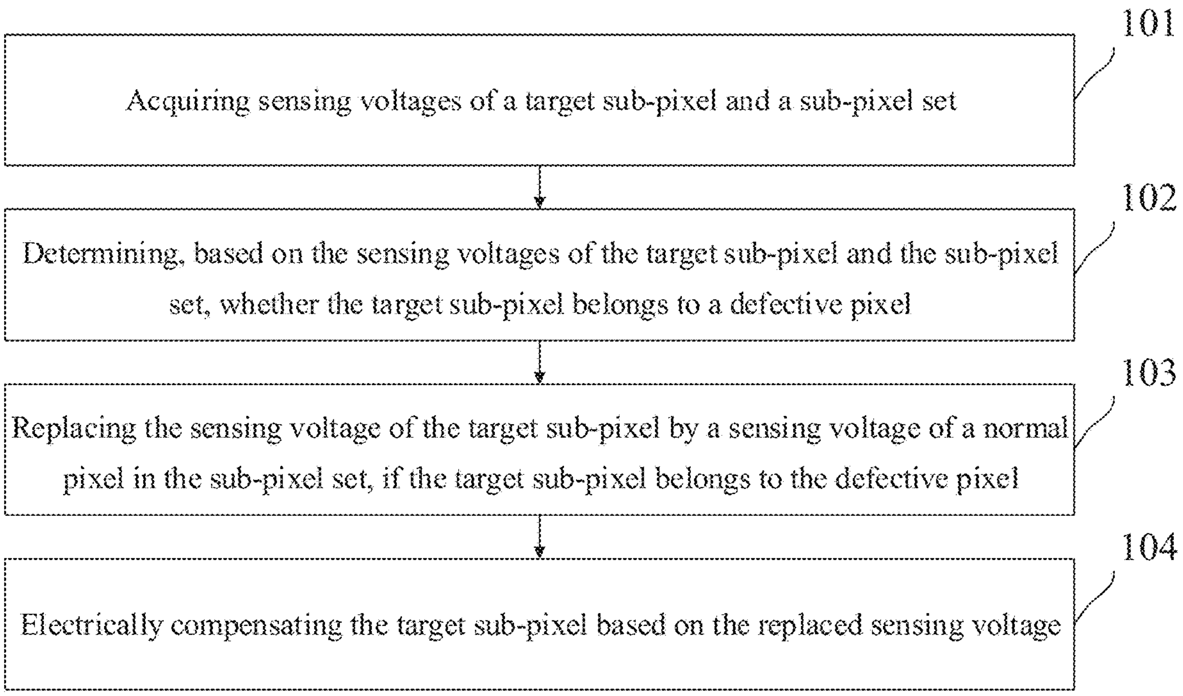
FIG. 4 is a flowchart of a compensating method for a display panel according to an embodiment of the present disclosure.

FIG. 4 is a flowchart of a compensating method for a display panel according to an embodiment of the present disclosure. As shown in FIG. 4, the method includes the following steps.

In 101, sensing voltages of a target sub-pixel and a sub-pixel set are acquired, where the sub-pixel set includes a plurality of first sub-pixels, and the first sub-pixels are disposed within a set range around the target sub-pixel and have the same color as the target sub-pixel.

Before compensation is performed according to the embodiment of the present disclosure, a defective pixel is required to be found out first, and sub-pixels with different colors are required to be distinguished in the process of finding out the defective pixel. For example, a pixel includes red, green and blue sub-pixels or red, green, blue and white sub-pixels. Before determining the defective pixel, the sensing voltages of the sub-pixels with the same color are compared to determine whether the defective pixel exists. The process of determining the defective pixel for each color is the same, and thus the embodiment of the present disclosure does not distinguish colors.

Figure 5:
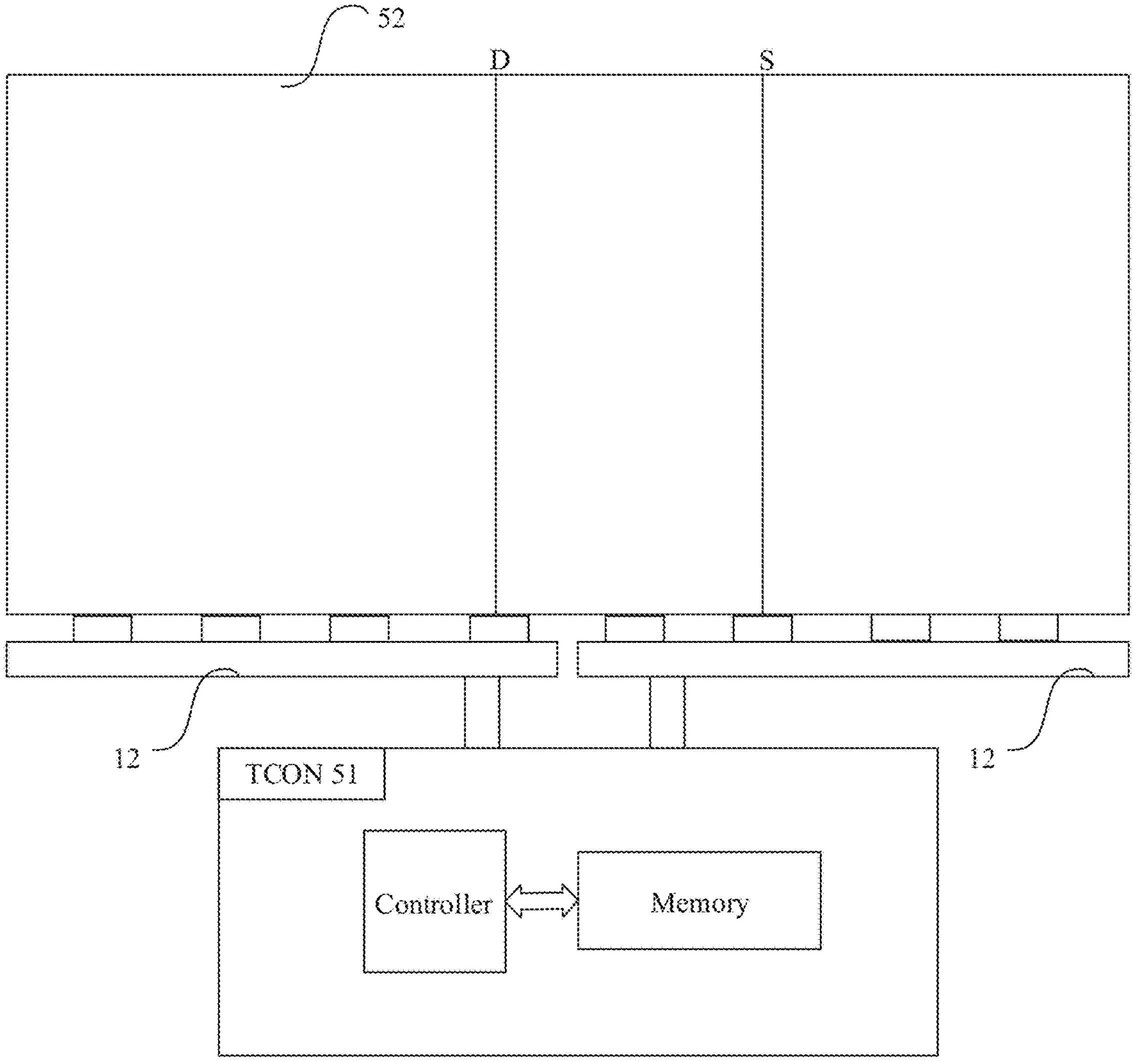
FIG. 5 is a schematic partial structural diagram of a display apparatus according to an embodiment of the present disclosure.

The method may be executed by a TCON in a display apparatus. FIG. 5 is a schematic partial structural diagram of the display apparatus according to an embodiment of the present disclosure. Referring to FIG. 5, the TCON 51 is connected to a display panel 52 through a source controller 12. It should be noted that a large-size display panel is shown in the figure, and thus there are two source controllers 12. In other implementations, the number of the source controllers may be one or more.

The TCON 51 acquires the sensing voltage of each pixel detected by the source controller through a sensing line (S, only one of which is shown as an example), so as to acquire the sensing voltages of the target sub-pixel and sub-pixel set.

As shown in FIG. 5, the TCON 51 includes controllers such as an application specific integrated circuit (ASIC)/a field programmable gate array (FPGA), which are configured to implement algorithms such as defective pixel determination and electrical compensation. The TCON further includes a flash memory (Flash)/electrically erasable programmable read only memory (EEPROM) and other memories, which are configured to cache the acquired sensing voltages. Thus, whether the target sub-pixel is the defective pixel can be determined based on the sensing voltages of the plurality of sub-pixels.

In 102, based on the sensing voltages of the target sub-pixel and the sub-pixel set, whether the target sub-pixel belongs to a defective pixel is determined.

In the embodiment of the present disclosure, the defective pixel refers to a point where the sensing voltage is abnormal. For example, compared with the sensing voltage of a first sub-pixel around the defective pixel, the sensing voltage of the defective pixel is too high or too low.

In the embodiment of the present disclosure, the sub-pixel set includes a plurality of first sub-pixels, and the first sub-pixels are disposed within a set range around the target sub-pixel and have the same color as the target sub-pixel.

In the set range around the target sub-pixel means the distance to the target sub-pixel does not exceed the set range.

For example, in a display panel with a resolution of 3840×2110, the distance between a first sub-pixel farthest from the target sub-pixel and the target sub-pixel within the set range does not exceed 6 unit lengths, and one unit length is the distance between two adjacent sub-pixels of the same color in the same row.

In 103, the sensing voltage of the target sub-pixel is replaced by a sensing voltage of a normal pixel in the sub-pixel set, if the target sub-pixel belongs to the defective pixel.

During replacement, the sensing voltage of the target sub-pixel is replaced by the sensing voltage of the normal pixel within the set range.

For example, a sensing voltage of a first sub-pixel within the set range is adopted, and the first sub-pixel has been determined as the normal pixel or the normal pixel replacing the defective pixel and is closest to the target sub-pixel.

In the case that there are many normal pixels with the same distance to choose from, the first sub-pixel in the same row as the target sub-pixel may be selected preferentially.

Of course, there may be a case that when it is determined the target sub-pixel belongs to the defective pixel, the normal pixel in the range has not been determined. In this case, it is possible to determine whether another pixel is the normal pixel, and then, 103 is executed after the normal pixel in the range is determined.

Optionally, if the target sub-pixel does not belong to the defective pixel but is the normal pixel, there is no need to replace the sensing voltage of the target sub-pixel.

In the embodiment of the present disclosure, the normal pixel refers to a point where the sensing voltage is normal. For example, compared with the sensing voltage of the first sub-pixel around the target sub-pixel, the sensing voltage of the normal pixel cannot be too high or too low.

In 104, the target sub-pixel is electrically compensated based on the replaced sensing voltage.

Electrical compensation refers to adjusting the Data voltage output to the target sub-pixel based on the threshold voltage used for driving the TFT and indicated by the sensing voltage to implement compensation.

In the embodiment of the present disclosure, the sensing voltages of the target sub-pixel and the sub-pixel set are acquired, and then whether the target sub-pixel is the defective pixel is determined based on the acquired sensing voltages. In the case that the target sub-pixel is the defective pixel, the target sub-pixel is replaced by any one of the other sub-pixels within the set range around the target sub-pixel, and then electrical compensation is performed, thereby avoiding a problem of incorrect compensation for the defective pixel.

Figure 6:
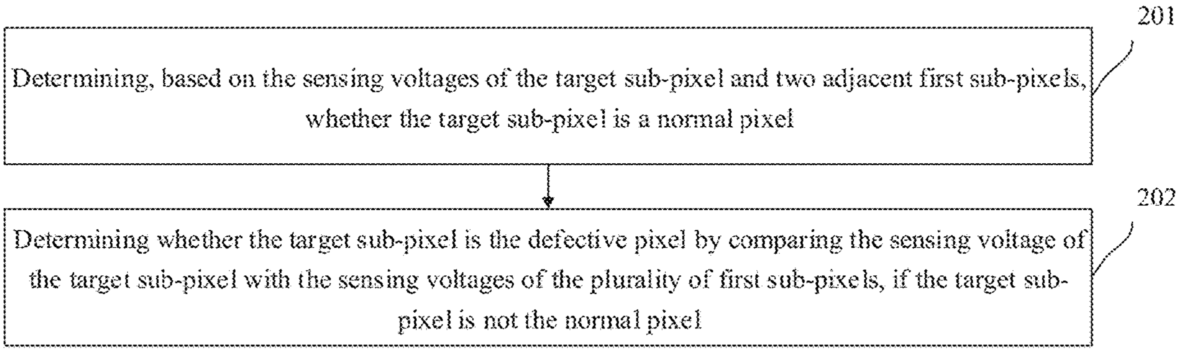
FIG. 6 is a flowchart for determining a defective pixel of a display panel according to an embodiment of the present disclosure.

FIG. 6 is a flowchart for determining a defective pixel of a display panel according to an embodiment of the present disclosure. As shown in FIG. 6, the flowchart includes the following steps.

In 201, based on the sensing voltages of the target sub-pixel and two adjacent first sub-pixels, whether the target sub-pixel is the normal pixel is determined, where the two adjacent first sub-pixels are two first sub-pixels, adjacent to the target sub-pixel, in the sub-pixel set.

In an exemplary embodiment, coordinates of the target sub-pixel are (M, N) which represent the $M^{th}$ row and $N^{th}$ column, and both M and N are positive integers. Here, the two adjacent first sub-pixels may be one adjacent sub-pixel on the left side and the other adjacent sub-pixel on the right side, or may be one adjacent sub-pixel on the upper side and the other adjacent sub-pixel on the lower side, or may be two consecutive sub-pixels adjacent to (M, N) on the left side, such as (M, N−1) and (M, N−2), or may be two consecutive sub-pixels adjacent to (M, N) on another side.

The coordinates here all use the coordinates of the target sub-pixel and a pixel where the first sub-pixel is disposed.

The characteristics of two adjacent sub-pixels with the same color on the panel are close or are in even transition, and thus the collected sensing voltages are not much different. By comparing differences of data (sensing voltages) of adjacent sub-pixels with the same color, which data may be defective pixel data can be determined.

In an exemplary embodiment, adjacent pixel units on the panel may have different arrangement periods (for example, an arrangement sequence of the first row of sub-pixels is RGB, an arrangement sequence of the second row of sub-pixels is BGR, and an arrangement sequence of the third row of sub-pixels is RGB . . . ). When the sensing voltage of the target sub-pixel is replaced by the sensing voltage of the normal pixel in the sub-pixel set, the normal sub-pixel with the same arrangement period and color in the sub-pixel set is preferred to replace the target sub-pixel. Since the arrangement periods are the same and the characteristics are closer, the collected sensing voltages do not have much difference.

For example, the target sub-pixel is disposed in the second row, and the normal pixels in the sub-pixel set corresponding to the target sub-pixel are distributed in the first row, the second row and third row simultaneously. When the sensing voltage of the target sub-pixel is replaced by the sensing voltage of the normal pixel, the sub-pixels of the normal pixel in the second row may be preferentially selected, because the sub-pixel arrangement period of the normal pixel in the second row is the same as that of the pixel where the target sub-pixel is disposed.

In a possible implementation of the present disclosure, this step may include:

determining that the target sub-pixel is the normal pixel, if a difference value between the sensing voltage of the target sub-pixel and the sensing voltage of each of the two adjacent first sub-pixels is within a threshold range.

That is, if a difference value acquired by comparing the target sub-pixel and each of the two adjacent first sub-pixels is within the threshold range, it indicates that target sub-pixel is the normal pixel.

Or, it is determined that the target sub-pixel is the normal pixel, if a difference value between the sensing voltage of the target sub-pixel and the sensing voltage of a normal pixel in the two adjacent first sub-pixels is within the threshold range.

That is, if the difference value acquired by comparing the target sub-pixel with the normal pixel is within the threshold range, it indicates that the target sub-pixel is the normal pixel.

The normal pixel in this case may be the normal pixel itself or the normal pixel replacing the defective pixel.

Besides, if other situations indicate that the target sub-pixel is not the normal pixel, it is required to further determine whether the target sub-pixel is the defective pixel through 202. Other situations include:

determining that the target sub-pixel is not the normal pixel, if the difference value between the sensing voltage of the target sub-pixel and the sensing voltage of each of the two adjacent first sub-pixels is not within the threshold range; or, determining that the target sub-pixel is not the normal pixel, if the difference value between the sensing voltage of the target sub-pixel and the sensing voltage of one of the two adjacent first sub-pixels is within the threshold range and this sub-pixel is not the normal pixel.

In the embodiment of the present disclosure, the threshold range is [−P, P], where P is a positive integer and the value of P is negatively related to the uniformity of the display panel. That is, the better the uniformity of the display panel is, the smaller the value of P is; and the worse the uniformity of the display panel is, the larger the value of P is.

Here, the uniformity may be the uniformity of the threshold voltage (or mobility ratio) of each pixel for driving the TFT in the display panel.

In this implementation, the panel with excellent uniformity has small fluctuation and the corresponding P value is small, such that the defective pixel can be determined within a small range. On the contrary, the panel with poor uniformity has large fluctuation and the P value is large, such that misjudgment caused by the smaller P value is avoided.

In an exemplary embodiment, the value of P ranges from 4 to 80, and the unit thereof is the acquisition accuracy of the sensing voltage acquired by an analog to digital converter (ADC) in the source controller.

In the embodiment of the present disclosure, the value of P may be related to the range of the ADC, and for example, the value of the ADC is 1%-10%. For example, the range of the ADC is usually 400-800, and the value of P may also be 4 to 80.

In an exemplary embodiment, the acquisition accuracy of the sensing voltage acquired by the ADC may be 0.002 V-0.003 V.

In the embodiment of the present disclosure, the value of P is stored in a memory of a TCON, and the controller reads the value stored in the memory at each startup or at regular intervals to apply the value.

In an exemplary embodiment, a plurality of values of P may be stored in the TCON synchronously, and one of them is selected for application. For example, in the process of determining the defective pixel, the value of P may be dynamically selected, for example, the farther the first sub-pixel is, the larger the P for calculating the difference value is.

For example, when determining whether the sensing voltages of the target sub-pixel and different first sub-pixels are within the threshold range, the values of P are different.

The value of P when determining whether the difference value between the sensing voltage of the target sub-pixel and a sensing voltage of a second sub-pixel is within the threshold range is greater than the value of P when determining whether the difference value between the sensing voltage of the target sub-pixel and a sensing voltage of a third sub-pixel is within the threshold range, where the second sub-pixel and the third sub-pixel are two of the plurality of first sub-pixels, and the distance between the third sub-pixel and the target sub-pixel is shorter than the distance between the second sub-pixel and the target sub-pixel.

Since the closest sub-pixels of the same color usually have the closest values thereof, the smallest threshold range is used, and the farther sub-pixels use a larger threshold range to ensure the determination accuracy.

In 202, whether the target sub-pixel is the defective pixel is determined by comparing the sensing voltage of the target sub-pixel with the sensing voltages of the plurality of first sub-pixels, if the target sub-pixel is not the normal pixel, where the plurality of first sub-pixels is at least partially different from the two adjacent first sub-pixels.

In a possible implementation of the present disclosure, this step may include:

determining that the target sub-pixel is the defective pixel, if the difference value between the sensing voltage of the target sub-pixel and a sensing voltage of any one of B first sub-pixels in A first sub-pixels is greater than an upper limit of the threshold range or less than a lower limit of the threshold range; or, determining that the target sub-pixel is the defective pixel, if the difference value between the sensing voltage of the target sub-pixel and a sensing voltage of any one of D first sub-pixels in C first sub-pixels is greater than an upper limit of the threshold range or less than a lower limit of the threshold range, where A, B, C and D are all positive integers, A is greater than or equal to B, B is greater than or equal to 2, C is greater than or equal to D, and D is greater than B.

Here, A first sub-pixels may be A first sub-pixels whose set range is closer to the target sub-pixel (than the first sub-pixels except A first sub-pixels). Here, C first sub-pixels may be C first sub-pixels whose set range is closer to the target sub-pixel (than the first sub-pixels except C first sub-pixels).

For example, A, B, C and D are 4, 3, 6 and 4, respectively. For another example, A, B, C and D are 3, 2, 4 and 3, respectively.

In the above implementation, if there are a plurality of consecutive cases that the difference value is higher or lower than the threshold, it indicates that consecutive defective pixels may occur.

In addition to this, other cases indicate that the pixel is the normal pixel, and other cases are determined as follows:

determining whether the difference value between the sensing voltage of the target sub-pixel and the sensing voltage of any one of D first sub-pixels in C first sub-pixels is greater than the upper limit of the threshold range or less than the lower limit of the threshold range, if the difference values between the sensing voltage of the target sub-pixel and the sensing voltages of any B first sub-pixels in A first sub-pixels are not all greater than the upper limit of the threshold range or not all less than the lower limit of the threshold range; and determining that the target sub-pixel is the normal pixel, if the difference values between the sensing voltage of the target sub-pixel and the sensing voltages of any D first sub-pixels in C first sub-pixels are not all less than the lower limit of the threshold range or not all greater than the upper limit of the threshold range.

In the embodiment of the present disclosure, the defective pixel is determined in a fashion of gradually expanding a comparison range. Because the distance to the closest first sub-pixel is short, the comparison therebetween is performed preferably, and the range is further expanded when the defective pixel cannot be determined only based on the closest first sub-pixel. This two-step determination fashion determines whether the target sub-pixel belongs to the defective pixel to the greatest extent, and saves more resources than direct comparison with the plurality of first sub-pixels.

In the implementation of the present disclosure, the sub-pixel set includes at least part of first sub-pixels within the following coordinate range:

the abscissa range is M−6 to M+6, and the ordinate range is N−6 to N+6.

More first sub-pixels are selected for reference to avoid the influence of consecutive defective pixels on determination. In addition, due to the existence of edge sub-pixels, the value of this range is larger. Actually, values of sub-pixels at different positions may be further provided.

What is summarized above is a general strategy of selecting pixels (in the first sub-pixels) around (M, N). For the same display panel, when the positions of (M, N) are different, the selected pixels around it may also be different.

For example, in the case that (M, N) is the pixel in the middle of the panel, when selecting the pixels around (M, N), the abscissa range is M−3 to M+3 and the ordinate range is N−3 to N+3.

For example, in the case that (M, N) is disposed on the left or right side edge, when selecting the pixels around (M, N), the abscissa should be specially considered, such as:

in the case that (M, N) is in the first column, when selecting the pixels around (M, N), the abscissa range is M to M+6;

in the case that (M, N) is in the second column, when selecting the pixels around (M, N), the abscissa range is M−1 to M+5;

in the case that (M, N) is in the third column, when selecting the pixels around (M, N), the abscissa range is M−2 to M+4;

in the case that (M, N) is in the tailender column, when selecting the pixels around (M, N), the abscissa range is M−6 to M;

in the case that (M, N) is in the penultimate column, when selecting the pixels around (M, N), the abscissa range is M−5 to M+1; and in the case that (M, N) is in the antepenultimate column, when selecting the pixels around (M, N), the abscissa range is M−4 to M+2.

For example, in the case that (M, N) is disposed on the upper or lower side edge, when selecting the pixels around (M, N), the ordinate should be specially considered, such as:

in the case that (M, N) is in the first row, when selecting the pixels around (M, N), the ordinate range is N to N+6;

in the case that (M, N) is in the second row, when selecting the pixels around (M, N), the ordinate range is N−1 to N+5;

in the case that (M, N) is in the third row, when selecting the pixels around (M, N), the ordinate range is N−2 to N+4;

in the case that (M, N) is in the tailender row, when selecting the pixels around (M, N), the ordinate range is N−6 to N;

in the case that (M, N) is in the penultimate row, when selecting the pixels around (M, N), the ordinate range is N−5 to N+1; and in the case that (M, N) is in the antepenultimate row, when selecting the pixels around (M, N), the ordinate range is N−4 to N+2.

However, in the case that (M, N) is disposed at any one of the four corners of the display panel, it is required to consider both the abscissa and the ordinate at the same time, and just refer to the range of the abscissa and the ordinate in the case that (M, N) is close to the edge, which is not repeated herein.

The range considered herein actually includes still more pixels. Further, pixels may be further selected within the threshold range as the basis for determining the defective pixel. For example, pixels in the same row are selected since the distances between the pixels in the same row are shorter and moreover, the sensing voltages of the pixels in the same row are continuously detected, thereby facilitating the acquisition and storage of the sensing voltages required for determining the defective pixel.

Of course, pixels in the same column may also be used, or the closest pixels may be selected. For example, in the case that (M, N) is disposed in the middle, six pixels encircling (M, N) are selected.

Due to the existence of the above cases about the positions of (M, N), the determination of a defective pixel is explained respectively below by taking pixels in the same row as an example, when (M, N) is disposed in the middle, left side edge and right side edge.

In the first case, (M, N) is disposed in the middle of the display panel, and the pixel scanning direction is from left to right, which is described below with reference to FIG. 7.

Figure 7:
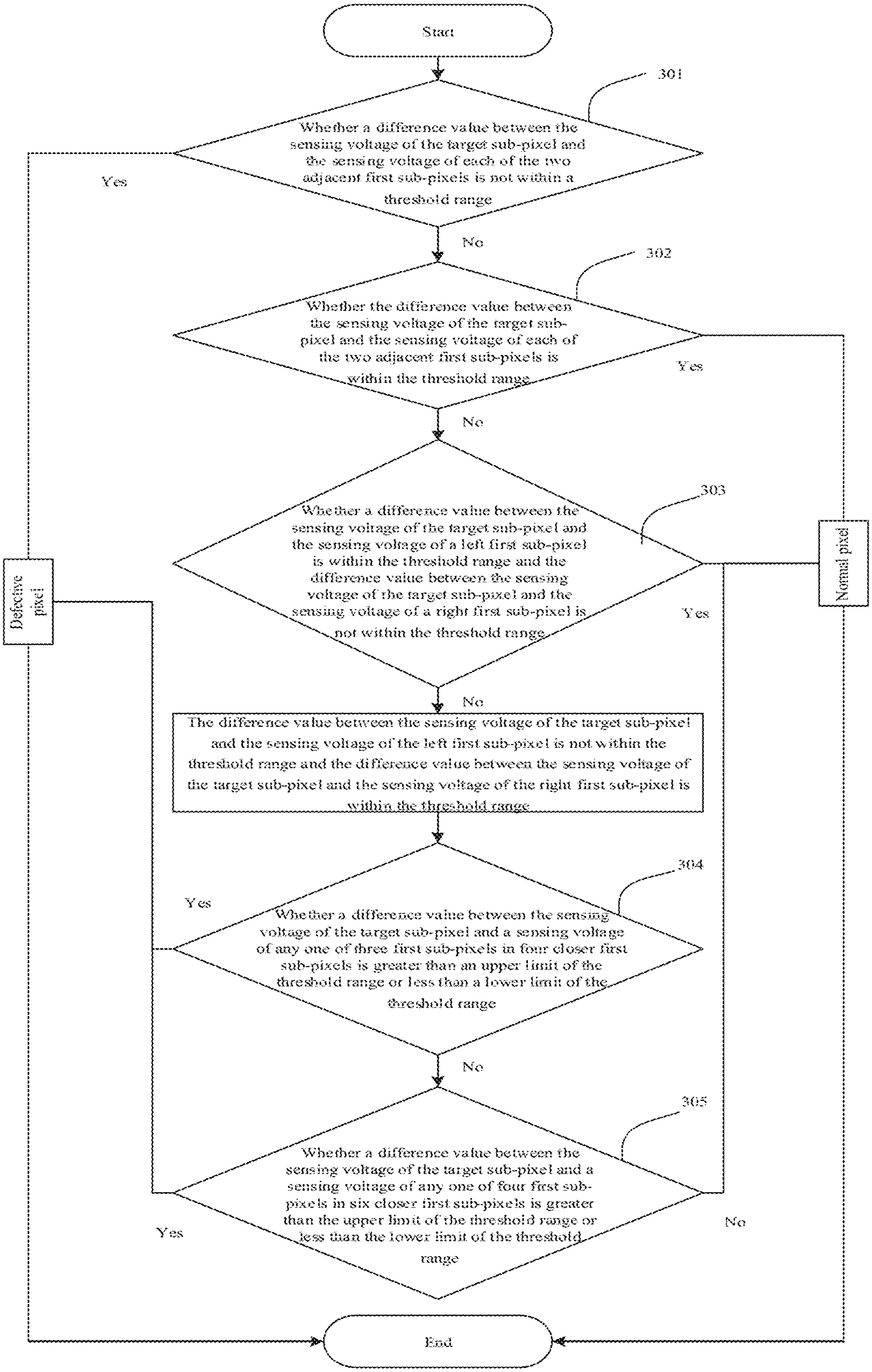
FIG. 7 is a flowchart for determining a defective pixel of a display panel according to an embodiment of the present disclosure.

FIG. 7 is a flowchart of a method for determining a defective pixel of a display panel according to an embodiment of the present disclosure. As shown in FIG. 7, the method includes the following steps.

In 301, whether a difference value between a sensing voltage of a target sub-pixel and a sensing voltage of each of two adjacent first sub-pixels is not within a threshold range is determined.

For example, whether the difference value between the sensing voltage of the target sub-pixel and the sensing voltage of each of the two adjacent first sub-pixels is not within the threshold range [−40, 40] is determined.

If yes, it is determined that (M, N) is the defective pixel, otherwise, 302 is executed.

The two adjacent first sub-pixels are (M, N−1) and (M, N+1), respectively.

In the embodiment of the present disclosure, the sensing voltage of each pixel required to be used is cached in the memory after being acquired, and it is only necessary to acquire the sensing voltage from the memory and then use it.

In 302, whether the difference value between the sensing voltage of the target sub-pixel and the sensing voltage of each of two adjacent first sub-pixels is within the threshold range is determined.

If yes, it is determined that (M, N) is a normal pixel, otherwise, 303 is executed.

In 303, whether a difference value between the sensing voltage of the target sub-pixel and a sensing voltage of a left first sub-pixel is within the threshold range, and a difference value between the sensing voltage of the target sub-pixel and a sensing voltage of a right first sub-pixel is not within the threshold range is determined.

The scanning direction of the pixels is from left to right. Data on the left are masked (for example, are the normal pixels or the replaced defective pixels), and are all correct data. If there is little difference with the data on the left, it proves that data of the target sub-pixel is normal data.

If yes, it is determined that (M, N) is the normal pixel, otherwise, 304 is executed. If not, it means that the data can only be larger or smaller than the data on the left by a value, but not at the same time larger or smaller than the data on the right by a value, and this indicates that in this case, there may be two consecutive defective pixels, or the data has an upward or downward trend; in the former case, filtering is required; and in the latter case, no filtering is required, and in this case, follow-up continuous determination is performed.

If the scanning is from right to left, the step is to determine whether the difference value between the sensing voltage of the target sub-pixel and the sensing voltage of the right first sub-pixel is within the threshold range, and the difference value between the sensing voltage of the target sub-pixel and the sensing voltage of the left first sub-pixel is not within the threshold range.

In 304, whether the difference value between the sensing voltage of the target sub-pixel and a sensing voltage of any one of three first sub-pixels in four first sub-pixels within a set range around the target sub-pixel is greater than an upper limit of the threshold range or less than a lower limit of the threshold range.

Here, the four first sub-pixels are (M, N−2), (M, N−1), (M, N+1) and (M, N+2).

If yes, it is determined that (M, N) is the defective pixel, otherwise, 305 is executed. If yes, it means that there are consecutive defective pixels. If not, there may be three consecutive defective pixels, or the data may have an upward or downward trend. In this case, follow-up continuous determination is performed.

In 305, whether the difference value between the sensing voltage of the target sub-pixel and a sensing voltage of any one of four first sub-pixels in six first sub-pixels within the set range around the target sub-pixel is greater than the upper limit of the threshold range or less than the lower limit of the threshold range.

Here, the six first sub-pixels are (M, N−3), (M, N−2), (M, N−1), (M, N+1), (M, N+2) and (M, N+3).

If yes, it is determined that (M, N) is the defective pixel; and if not, it is determined that (M, N) is the normal pixel. If yes, it means that there are three consecutive defective pixels. If not, it is considered that the data has a trend change, because the probability of four consecutive first sub-pixels is very small, and the data of the target sub-pixel is normally used. Of course, in other implementations, after 305, pixels may be continuously added for determination.

In this implementation, the values of A, B, C and D are 4, 3, 6 and 4, respectively. In other implementations, the values of A, B, C and D may also be 5, 4, 7, 5, etc. respectively.

For example, in 304, (M, N) is compared with three first sub-pixels at the upper, the left and the right side adjacent to (M, N) and two first sub-pixels on the left and right spaced from (M, N). If in the comparison with the data of these five sub-pixels, there is a larger difference (that is, the difference is out of the range) between (M, N) and each of the four sub-pixels in the five sub-pixels and is greater than the upper limit or less than the lower limit, the target sub-pixel is considered as the defective pixel.

In 305, the target sub-pixel may be further compared with data of seven first sub-pixels around the target sub-pixel, and if there is a larger difference value between the target sub-pixel and each of the five sub-pixels in the seven sub-pixels and is greater than the upper limit or less than the lower limit, the target sub-pixel is considered as the defective pixel.

In the embodiment of the present disclosure, the comparison with the target sub-pixel in each of the above steps adopts the first sub-pixels in the sub-pixel set described above, and the same is the case in the subsequent embodiments, which are not repeated one by one.

In the second case, (M, N) is disposed on the left side of the display panel, namely, (M, 1), and the pixel scanning direction is from left to right, which is described below with reference to FIG. 8.

Figure 8:
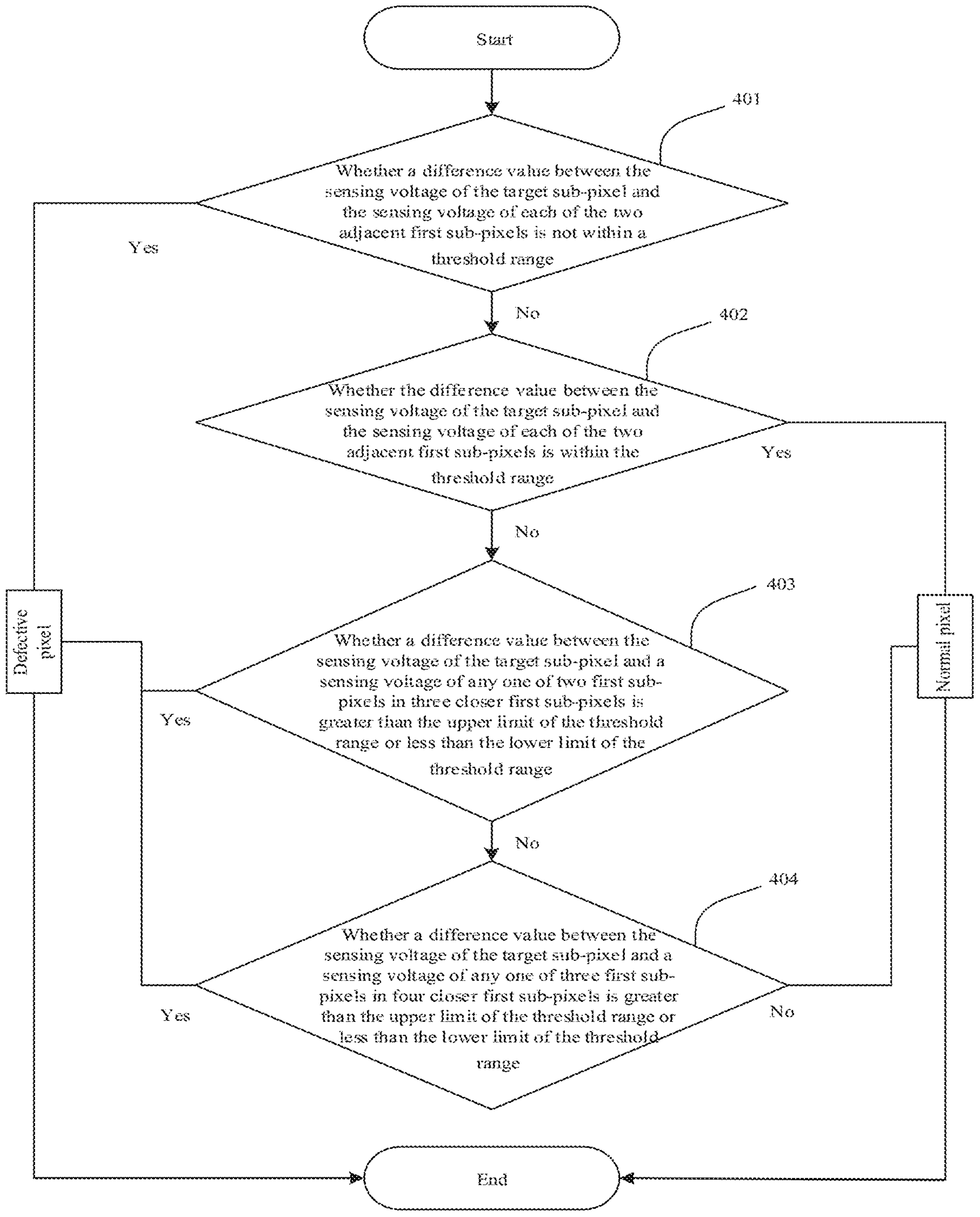
FIG. 8 is a flowchart for determining a defective pixel of a display panel according to an embodiment of the present disclosure.

FIG. 8 is a flowchart of a method for determining a defective pixel of the display panel according to an embodiment of the present disclosure. Referring to FIG. 8, the method includes the following steps.

In 401, whether a difference value between a sensing voltage of a target sub-pixel having the coordinates of (M, 1) and a sensing voltage of each of two adjacent first sub-pixels is not within a threshold range is determined.

For example, whether the difference value between the sensing voltage of the target sub-pixel having the coordinates of (M, 1) and the sensing voltage of each of the two adjacent first sub-pixels is not within the threshold range [−40, 40] is determined.

If yes, it is determined that (M, 1) is the defective pixel, otherwise, 402 is executed.

Here, the two adjacent first sub-pixels are (M, 2) and (M, 3), respectively.

In 402, whether the difference value between the sensing voltage of the target sub-pixel having the coordinates of (M, 1) and the sensing voltage of each of two adjacent first sub-pixels is within the threshold range is determined.

If yes, it is determined that (M, 1) is the normal pixel, otherwise, 403 is executed.

Since (M, 2) and (M, 3) are both used for test, in this case, it is not required to execute the determination in 303.

In 403, whether the difference value between the sensing voltage of the target sub-pixel having the coordinates of (M, 1) and a sensing voltage of any one of two first sub-pixels in three first sub-pixels within a set range around the target sub-pixel is greater than the upper limit of the threshold range or less than the lower limit of the threshold range.

Here, the three adjacent first sub-pixels are (M, 2), (M, 3) and (M, 4), respectively.

If yes, it is determined that (M, 1) is the defective pixel, otherwise, 404 is executed.

In 404, whether the difference value between the sensing voltage of the target sub-pixel having the coordinates of (M, 1) and a sensing voltage of any one of three first sub-pixels in four first sub-pixels within the set range around the target sub-pixel is greater than the upper limit of the threshold range or less than the lower limit of the threshold range.

Here, the four first sub-pixels are (M, 2), (M, 3), (M, 4) and (M, 5).

If yes, it is determined that (M, 1) is the defective pixel; and if not, it is determined that (M, 1) is the normal pixel.

In the third case, (M, N) is disposed on the right side of a display panel, and by taking a row of 3840 pixels as an example, the pixel scanning direction is from left to right, which is described below with reference to FIG. 9.

Figure 9:
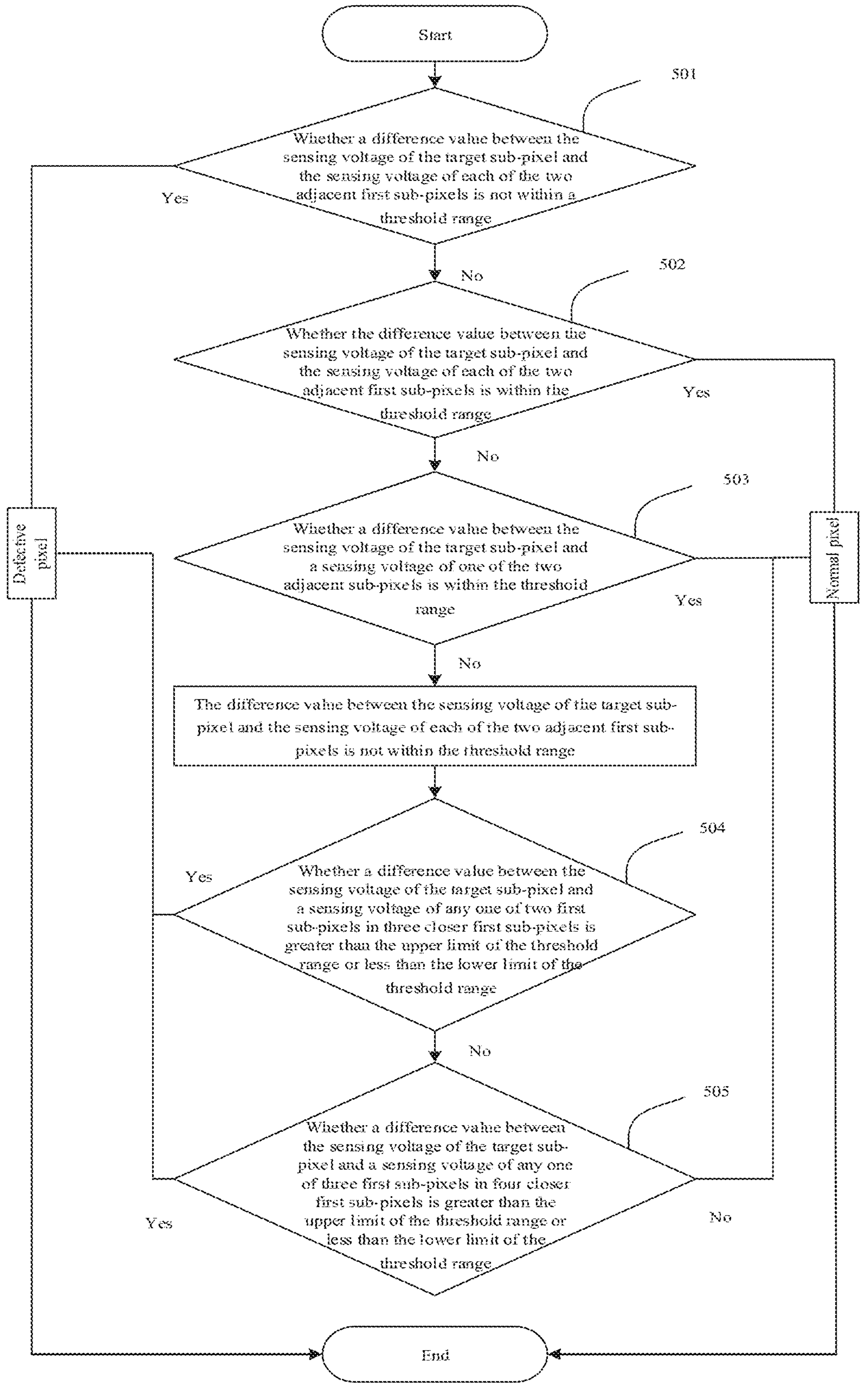
FIG. 9 is a flowchart for determining a defective pixel of a display panel according to an embodiment of the present disclosure.

FIG. 9 is a flowchart of a method for determining a defective pixel of the display panel according to an embodiment of the present disclosure. Referring to FIG. 9, the method includes the following steps.

In 501, whether a difference value between a sensing voltage of a target sub-pixel having the coordinates of (M, 3840) and a sensing voltage of each of two adjacent first sub-pixels is not within the threshold range is determined.

For example, whether the difference value between the sensing voltage of the target sub-pixel having the coordinates of (M, 3840) and the sensing voltage of each of the two adjacent first sub-pixels is not within the threshold range [−40, 40] is determined.

If yes, it is determined that (M, 3840) is the defective pixel, otherwise, 502 is executed.

Here, the two adjacent first sub-pixels are (M, 3838) and (M, 3839), respectively.

In 502, whether the difference value between the sensing voltage of the target sub-pixel having the coordinates of (M, 3840) and the sensing voltage of each of two adjacent first sub-pixels is within the threshold range is determined.

If yes, it is determined that (M, 3840) is the normal pixel, otherwise, 503 is executed.

In 503, whether a difference value between the sensing voltage of the target sub-pixel and a sensing voltage of one of the two adjacent sub-pixels is within the threshold range, and a difference value between the sensing voltage of the target sub-pixel and a sensing voltage of the other sub-pixel is not within the threshold range is determined.

The scanning direction of the pixels is from left to right, and a normal pixel or a replaced defective pixel is usually disposed on the left side.

If yes, it is determined that (M, 3840) is the normal pixel, otherwise, 504 is executed.

In 504, whether the difference value between the sensing voltage of the target sub-pixel having the coordinates of (M, 3840) and a sensing voltage of any one of two first sub-pixels in three first sub-pixels within a set range around the target sub-pixel is greater than the upper limit of the threshold range or less than the lower limit of the threshold range is determined.

Here, the three first sub-pixels are (M, 3837), (M, 3838) and (M, 3839).

If yes, it is determined that (M, 3840) is the defective pixel, otherwise, 505 is executed.

In 505, whether the difference value between the sensing voltage of the target sub-pixel having the coordinates of (M, 3840) and a sensing voltage of any one of three first sub-pixels in four first sub-pixels within the set range around the target sub-pixel is greater than the upper limit of the threshold range or less than the lower limit of the threshold range is determined.

Here, the four first sub-pixels are (M, 3836), (M, 3837), (M, 3838) and (M, 3839).

If yes, it is determined that (M, 3840) is the defective pixel; or if not, it is determined that (M, 3840) is the normal pixel.

Referring to FIGS. 8 and 9, in the case that (M, N) is disposed on the left or right side, fewer reference points are selected than in the case that (M, N) is disposed in the middle of the panel, thereby avoiding the selection of reference points that are too distal from (M, N).

In addition, (M, N) at the most edge is considered in FIGS. 8 and 9. While (M, N) is disposed in a column adjacent to the edge, one first sub-pixel on one side and two or three first sub-pixels on the other side may be selected. In the case that (M, N) is disposed in a column separated from the edge by one column, two first sub-pixels on one side and two or three first sub-pixels on the other side may be selected.

The above distances are all in the row direction as an example. For using a point in the column or another position as a reference point, the principle of modes for selecting the first sub-pixel as the reference is the same and is not repeated.

Through the method according to the embodiment of the present disclosure, even two, three and four consecutive defective pixels can be determined, and then, are replaced by the sensing voltage of the normal pixel, such that the incorrect compensation is avoided, thereby improving the panel quality.

Figure 10:
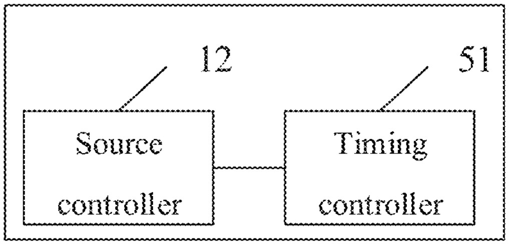
FIG. 10 is a block diagram of a compensating apparatus for a display panel according to an embodiment of the present disclosure.

FIG. 10 is a block diagram of a compensating apparatus for a display panel according to an embodiment of the present disclosure. As shown in FIG. 10, the compensating apparatus for the display panel includes a source controller 12 and a timing controller 51.

With reference to FIGS. 1, 5 and 10, the source controller 12 is electrically connected to sub-pixels of the display panel 52 through a sensing line S. The source controller 12 is further electrically connected to a data line D of the display panel 52, and the timing controller 51 is electrically connected to the source controller 12.

The source controller 12 is configured to acquire sensing voltages of a target sub-pixel and a sub-pixel set, where the sub-pixel set includes a plurality of first sub-pixels, and the first sub-pixels are disposed in a set range around the target sub-pixel and have the same color as the target sub-pixel.

The timing controller 51 is electrically connected to the source controller, and configured to determine, based on the sensing voltages of the target sub-pixel and the sub-pixel set, whether the target sub-pixel belongs to a defective pixel, and replace the sensing voltage of the target sub-pixel by a sensing voltage of a normal pixel in the sub-pixel set, if the target sub-pixel belongs to the defective pixel, and transmit the replaced sensing voltage of the target sub-pixel to the source controller.

The source controller 12 is further configured to electrically compensate the target sub-pixel based on the replaced sensing voltage.

Optionally, the timing controller 51 is configured to:

determine, based on the sensing voltages of the target sub-pixel and two adjacent first sub-pixels, whether the target sub-pixel is the normal pixel, where the two adjacent first sub-pixels are two first sub-pixels, adjacent to the target sub-pixel, in the sub-pixel set; and determine that the target sub-pixel is the defective pixel by comparing the sensing voltage of the target sub-pixel with the sensing voltages of the plurality of first sub-pixels, if the target sub-pixel is not the normal pixel.

Optionally, the timing controller 51 is configured to:

determine that the target sub-pixel is the normal pixel, if a difference value between the sensing voltage of the target sub-pixel and the sensing voltage of each of the two adjacent first sub-pixels is within a threshold range; or, determine that the target sub-pixel is the normal pixel, if a difference value between the sensing voltage of the target sub-pixel and a sensing voltage of the normal pixel in the two adjacent first sub-pixels is within the threshold range.

Optionally, the timing controller 51 is configured to:

determine that the target sub-pixel is not the normal pixel, if the difference value between the sensing voltage of the target sub-pixel and the sensing voltage of each of the two adjacent first sub-pixels is not within the threshold range; or, determine that the target sub-pixel is not the normal pixel, if the difference value between the sensing voltage of the target sub-pixel and the sensing voltage of one of the two adjacent first sub-pixels is within the threshold range and one of the two adjacent first sub-pixels is not the normal pixel.

Optionally, the threshold range is:

[−P, P], P is a positive integer, a value range of P is 4 to 80, and the unit of P is acquisition accuracy of a sensing voltage acquired by an ADC in a source controller.

Optionally, the value of P when determining whether the difference value between the sensing voltage of the target sub-pixel and a sensing voltage of a second sub-pixel is within the threshold range is greater than the value of P when determining whether the difference value between the sensing voltage of the target sub-pixel and a sensing voltage of a third sub-pixel is within the threshold range, where the second sub-pixel and the third sub-pixel are two of the plurality of first sub-pixels, and the distance between the third sub-pixel and the target sub-pixel is shorter than the distance between the second sub-pixel and the target sub-pixel.

Optionally, the timing controller 51 is configured to:

determine that the target sub-pixel is the defective pixel, if the difference value between the sensing voltage of the target sub-pixel and a sensing voltage of any one of B first sub-pixels in A first sub-pixels is greater than the upper limit of the threshold range or less than the lower limit of the threshold range; or, determine that the target sub-pixel is the defective pixel, if the difference value between the sensing voltage of the target sub-pixel and a sensing voltage of any one of D first sub-pixels in C first sub-pixels is greater than the upper limit of the threshold range or less than the lower limit of the threshold range.

Optionally, the timing controller 51 is configured to:

determine whether the difference value between the sensing voltage of the target sub-pixel and the sensing voltage of any one of D first sub-pixels in C first sub-pixels is greater than the upper limit of the threshold range or less than the lower limit of the threshold range, if the difference values between the sensing voltage of the target sub-pixel and the sensing voltages of any B first sub-pixels in A first sub-pixels are not all greater than the upper limit of the threshold range or not all less than the lower limit of the threshold range; and determine that the target sub-pixel is the normal pixel, if the difference values between the sensing voltage of the target sub-pixel and the sensing voltages of any D first sub-pixels in C first sub-pixels are not all less than the lower limit of the threshold range or not all greater than the upper limit of the threshold range.

Optionally, coordinates of the target sub-pixel are (M, N) which represent the $M^{th}$ row and $N^{th}$ column, and both M and N are positive integers; and the sub-pixel set includes at least part of first sub-pixels within the following coordinate range:

the abscissa range is M−6 to M+6, and the ordinate range is N−6 to N+6.

It should be noted that when performing the defective pixel compensation, the compensating apparatus for the display panel according to the above embodiment only takes division of all the functional modules as an example for explanation. In practice, the above functions may be finished by the different functional modules as required. That is, the internal structure of the apparatus is divided into different functional modules to finish all or part of the functions described above. In addition, the compensating apparatus for the display panel according to the above embodiment has the same concept as the compensating method for the display panel according to the embodiment. Refer to the method embodiments for the implementation process of the apparatus, which is not be repeated herein.

Figure 11:
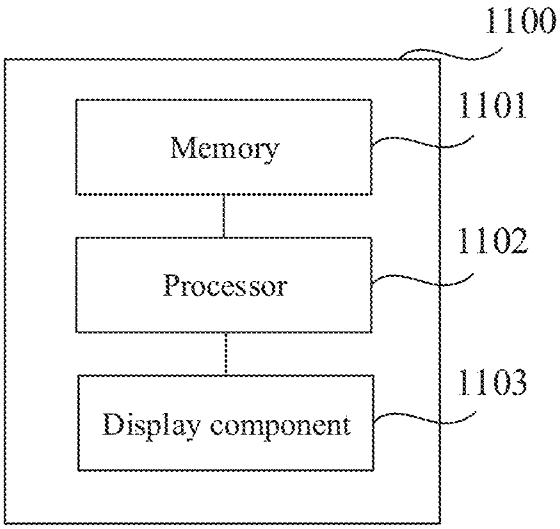
FIG. 11 is a schematic structural diagram of a display device according to an embodiment of the present disclosure.

As shown in FIG. 11, a display device 1100 is further provided according to an embodiment of the present disclosure, and is an apparatus for compensating the above display panel or a display device. The display device 1100 may be configured to execute the compensating method for the display panel according to the above all embodiments. Referring to FIG. 11, the display device 1100 includes a memory 1101, a processor 1102, and a display component 1103. Those skilled in the art can understand that the structure of the display device 1100 shown in FIG. 11 does not constitute a limitation to the display device 1100, and may include more or less components than those illustrated, or combine some components or adopt different component arrangements.

The memory 1101 may be configured to store computer programs and modules. The memory 1101 may mainly include a program storage region and a data storage region. The program storage region may store an operating system, applications required by at least one function, and the like. The memory 1101 may include a high-speed random access memory, and may further include a non-volatile memory, such as at least one disk memory device, a flash memory device, or other volatile solid-state memory devices. Correspondingly, the memory 1101 may further include a memory controller to provide access to the memory 1101 by the processor 1102.

The processor 1102 executes various function applications and data processing by running software programs and modules stored in the memory 1101.

The display module 1103 is configured to display an image, and may include a display panel. Optionally, the display panel may be configured in the form of a liquid crystal display (LCD), an organic light-emitting diode (OLED), etc.

In an exemplary embodiment, a computer-readable storage medium is further provided, is a nonvolatile storage medium, and a computer program is stored in the computer-readable storage medium. When the computer instruction is executed by a processor, the compensating method for the display panel according to the embodiments of the present disclosure can be executed.

In an exemplary embodiment, a computer program product storing an instruction therein is further provided. The instruction, when run on a computer, enables the computer to execute the compensating method for the display panel according to the embodiments of the present disclosure.

In an exemplary embodiment, a chip is further provided, and includes a programmable logic circuit and/or program instruction. When the chip runs, the compensating method for the display panel according to the embodiments of the present disclosure can be executed.

Persons of ordinary skill in the art can understand that all or part of the steps described in the above embodiments may be completed through hardware, or through relevant hardware instructed by applications stored in a computer-readable storage medium, such as a read-only memory, a magnetic disk or an optical disk.

The foregoing descriptions are merely optional embodiments of the present disclosure, and are not intended to limit the present disclosure. Within the spirit and principles of the present disclosure, any modifications, equivalent substitutions, improvements, etc., are within the protection scope of the present disclosure.

The invention claimed is:

1. A compensating method for a display panel, comprising:

acquiring sensing voltages of a target sub-pixel and a sub-pixel set, wherein the sub-pixel set comprises a plurality of first sub-pixels, and the first sub-pixels are disposed within a set range around the target sub-pixel and have a same color as the target sub-pixel;

determining, based on the sensing voltages of the target sub-pixel and the sub-pixel set, whether the target sub-pixel belongs to a defective pixel;

replacing the sensing voltage of the target sub-pixel by a sensing voltage of a normal pixel in the sub-pixel set, if the target sub-pixel belongs to the defective pixel; and electrically compensating the target sub-pixel based on a replaced sensing voltage, wherein determining, based on the sensing voltages of the target sub-pixel and the sub-pixel set, whether the target sub-pixel belongs to the defective pixel comprises:

determining, whether the target sub-pixel is the normal pixel by comparing the sensing voltage of the target sub-pixel with sensing voltages of two adjacent first sub-pixels, wherein the two adjacent first sub-pixels are two first sub-pixels, adjacent to the target sub-pixel, in the sub-pixel set; and determining whether the target sub-pixel is the defective pixel by comparing the sensing voltage of the target sub-pixel with sensing voltages of the plurality of first sub-pixels, if the target sub-pixel is not the normal pixel, wherein the plurality of first sub-pixels are at least partially different from the two adjacent first sub-pixel.

2. The method according to claim 1, wherein determining whether the target sub-pixel is the normal pixel by comparing the sensing voltage of the target sub-pixel with the sensing voltages of the two adjacent first sub-pixels comprises:

determining that the target sub-pixel is the normal pixel, if a difference value between the sensing voltage of the target sub-pixel and the sensing voltage of each of the two adjacent first sub-pixels is within a threshold range; or, determining that the target sub-pixel is the normal pixel, if a difference value between the sensing voltage of the target sub-pixel and a sensing voltage of a normal pixel in the two adjacent first sub-pixels is within a threshold range.

3. The method according to claim 2, wherein determining whether the target sub-pixel is the normal pixel by comparing the sensing voltage of the target sub-pixel with the sensing voltages of the two adjacent first sub-pixels further comprises:

determining that the target sub-pixel is not the normal pixel, if the difference value between the sensing voltage of the target sub-pixel and the sensing voltage of each of the two adjacent first sub-pixels is not within the threshold range; or, determining that the target sub-pixel is not the normal pixel, if a difference value between the sensing voltage of the target sub-pixel and a sensing voltage of one of the two adjacent first sub-pixels is within the threshold range and one of the two adjacent first sub-pixels is not the normal pixel.

4. The method according to claim 2, wherein the threshold range is:

[−P, P], P is a positive integer, a value range of P is 4 to 80, and a unit of P is acquisition accuracy of a sensing voltage acquired by an ADC in a source controller.

5. The method according to claim 4, wherein a value of P when determining whether a difference value between the sensing voltage of the target sub-pixel and a sensing voltage of a second sub-pixel is within the threshold range is greater than a value of P when determining whether a difference value between the sensing voltage of the target sub-pixel and a sensing voltage of a third sub-pixel is within the threshold range, and wherein the second sub-pixel and the third sub-pixel are two of the plurality of first sub-pixels, and a distance between the third sub-pixel and the target sub-pixel is shorter than a distance between the second sub-pixel and the target sub-pixel.

6. The method according to claim 1, wherein determining whether the target sub-pixel is the detective pixel by comparing the sensing voltage of the target sub-pixel with the sensing voltages of the plurality of first sub-pixels comprises:

determining that the target sub-pixel is the defective pixel, if a difference value between the sensing voltage of the target sub-pixel and a sensing voltage of any one of B first sub-pixels in A first sub-pixels is greater than an upper limit of the threshold range or less than a lower limit of the threshold range; or, determining that the target sub-pixel is the defective pixel, if a difference value between the sensing voltage of the target sub-pixel and a sensing voltage of any one of D first sub-pixels in C first sub-pixels is greater than an upper limit of the threshold range or less than a lower limit of the threshold range, wherein A, B, C and D are all positive integers, A is greater than or equal to B, B is greater than or equal to 2, C is greater than or equal to D, and D is greater than B.

7. The method according to claim 6, wherein determining whether the target sub-pixel is the detective pixel by comparing the sensing voltage of the target sub-pixel with the sensing voltages of the plurality of first sub-pixels further comprises:

determining whether the difference value between the sensing voltage of the target sub-pixel and the sensing voltage of any one of D first sub-pixels in C first sub-pixels is greater than the upper limit of the threshold range or less than the lower limit of the threshold range, if difference values between the sensing voltage of the target sub-pixel and sensing voltages of any B first sub-pixels in A first sub-pixels are not all greater than the upper limit of the threshold range or not all less than the lower limit of the threshold range; and determining that the target sub-pixel is the normal pixel, if difference values between the sensing voltage of the target sub-pixel and sensing voltages of any D first sub-pixels in C first sub-pixels are not all less than the lower limit of the threshold range or not all greater than the upper limit of the threshold range.

8. The method according to claim 1, wherein coordinates of the target sub-pixel are (M, N) which represent an $M^{th}$ row and $N^{th}$ column, and both M and N are positive integers; and the sub-pixel set comprises at least part of first sub-pixels within a following coordinate range:

an abscissa range is M−6 to M+6, and an ordinate range is N−6 to N+6.

9. A display device, comprising a processor and a memory, wherein the memory is configured to store a computer program; and the processor is configured to execute the computer program stored in the memory to implement the compensating method for the display panel according to claim 1.

10. A non-transitory computer-readable storage medium storing a computer instruction therein, wherein when the computer instruction is executed by a processor, the compensating method for the display panel according to claim 1 is implemented.

11. A compensating apparatus for a display panel, comprising:

a source controller, wherein the source controller is electrically connected to sub-pixels of the display panel through a sensing line and is configured to acquire sensing voltages of a target sub-pixel and a sub-pixel set, the sub-pixel set comprises a plurality of first sub-pixels, and the first sub-pixels are disposed within a set range around the target sub-pixel and have a same color as the target sub-pixel; and a timing controller, wherein the timing controller is electrically connected to the source controller and is configured to: determine, based on the sensing voltages of the target sub-pixel and the sub-pixel set, whether the target sub-pixel belongs to a defective pixel, replace the sensing voltage of the target sub-pixel by a sensing voltage of a normal pixel in the sub-pixel set, if the target sub-pixel belongs to the defective pixel, and transmit a replaced sensing voltage of the target sub-pixel to the source controller, wherein the source controller is further electrically connected to a data line of the display panel, and is configured to electrically compensate the target sub-pixel based on the replaced sensing voltage; and wherein the timing controller is configured to:

determine, based on sensing voltages of the target sub-pixel and two adjacent first sub-pixels, whether the target sub-pixel is the normal pixel, wherein the two adjacent first sub-pixels are two first sub-pixels, adjacent to the target sub-pixel, in the sub-pixel set; and determine whether the target sub-pixel is the defective pixel by comparing the sensing voltage of the target sub-pixel with sensing voltages of the plurality of first sub-pixels, if the target sub-pixel is not the normal pixel, wherein the plurality of first sub-pixels are at least partially different from the two adjacent first sub-pixels.

12. The apparatus according to claim 11, wherein the timing controller is configured to:

determine that the target sub-pixel is the normal pixel, if a difference value between the sensing voltage of the target sub-pixel and the sensing voltage of each of the two adjacent first sub-pixels is within a threshold range; or, determine that the target sub-pixel is the normal pixel, if a difference value between the sensing voltage of the target sub-pixel and a sensing voltage of a normal pixel in the two adjacent first sub-pixels is within a threshold range.

13. The apparatus according to claim 12, wherein the timing controller is further configured to:

determine that the target sub-pixel is not the normal pixel, if the difference value between the sensing voltage of the target sub-pixel and the sensing voltage of each of the two adjacent first sub-pixels is not within the threshold range; or, determine that the target sub-pixel is not the normal pixel, if a difference value between the sensing voltage of the target sub-pixel and a sensing voltage of one of the two adjacent first sub-pixels is within the threshold range and one of the two adjacent first sub-pixels is not the normal pixel.

14. The apparatus according to claim 12, wherein the threshold range is:

[−P, P], P is a positive integer, a value range of P is 4 to 80, and a unit of P is acquisition accuracy of a sensing voltage acquired by an ADC in a source controller.

15. The apparatus according to claim 14, wherein a value of P when determining whether a difference value between the sensing voltage of the target sub-pixel and a sensing voltage of a second sub-pixel is within the threshold range is greater than a value of P when determining whether a difference value between the sensing voltage of the target sub-pixel and a sensing voltage of a third sub-pixel is within the threshold range, and wherein the second sub-pixel and the third sub-pixel are two of the plurality of first sub-pixels, and a distance between the third sub-pixel and the target sub-pixel is shorter than a distance between the second sub-pixel and the target sub-pixel.

16. The apparatus according to claim 11, wherein the timing controller is configured to:

determine that the target sub-pixel is the defective pixel, if a difference value between the sensing voltage of the target sub-pixel and a sensing voltage of any one of B first sub-pixels in A first sub-pixels is greater than an upper limit of the threshold range or less than a lower limit of the threshold range; or, determine that the target sub-pixel is the defective pixel, if a difference value between the sensing voltage of the target sub-pixel and a sensing voltage of any one of D first sub-pixels in C first sub-pixels is greater than an upper limit of the threshold range or less than a lower limit of the threshold range, wherein A, B, C and D are all positive integers, A is greater than or equal to B, B is greater than or equal to 2, C is greater than or equal to D, and D is greater than B.

17. The apparatus according to claim 16, wherein the timing controller is further configured to:

determine whether the difference value between the sensing voltage of the target sub-pixel and the sensing voltage of any one of D first sub-pixels in C first sub-pixels is greater than the upper limit of the threshold range or less than the lower limit of the threshold range, if the difference values between the sensing voltage of the target sub-pixel and sensing voltages of any B first sub-pixels in A first sub-pixels are not all greater than the upper limit of the threshold range or not all less than the lower limit of the threshold range; and determine that the target sub-pixel is the normal pixel, if difference values between the sensing voltage of the target sub-pixel and sensing voltages of any D first sub-pixels in C first sub-pixels are not all less than the lower limit of the threshold range or not all greater than the upper limit of the threshold range.

18. The apparatus according to claim 11, wherein coordinates of the target sub-pixel are (M, N) which represent an $M^{th}$ row and $N^{th}$ a column, and both M and N are positive integers; and the sub-pixel set comprises at least part of first sub-pixels within a following coordinate range:

an abscissa range is M−6 to M+6, and an ordinate range is N−6 to N+6.

* * * * *